United States Patent [19]

Bradley

[11] 4,408,227
[45] Oct. 4, 1983

[54] METHOD AND APPARATUS FOR TELEVISION DISTRIBUTION SYSTEM SWEEP TESTING

[75] Inventor: Jack Bradley, Cupertino, Calif.

[73] Assignee: Cushman Electronics, Inc., San Jose, Calif.

[21] Appl. No.: 269,796

[22] Filed: Jun. 3, 1981

[51] Int. Cl.³ .............................................. H04N 7/02
[52] U.S. Cl. ..................................... 358/139; 358/10
[58] Field of Search ................................... 358/139, 10

[56] References Cited

U.S. PATENT DOCUMENTS 2,885,470  5/1959  Bartelink .............................. 358/139
4,207,431  6/1980  McVoy ................................. 358/139

Primary Examiner—Robert L. Griffin
Assistant Examiner—Edward L. Coles
Attorney, Agent, or Firm—Herbert C. Schulze

[57] ABSTRACT

This invention is a method (and an apparatus in combination) for sweep testing of cable television distribution systems and the like, wherein time division multiplexing between test signal and program signal is accomplished in such manner as to eliminate interference to the program signal due to testing. Additionally, the test signal received by the detector is time demultiplexed in such manner that the test signal is displayed clearly without interfering signals.

1 Claim, 3 Drawing Figures

BLOCK DIAGRAM OF TEST SYSTEM

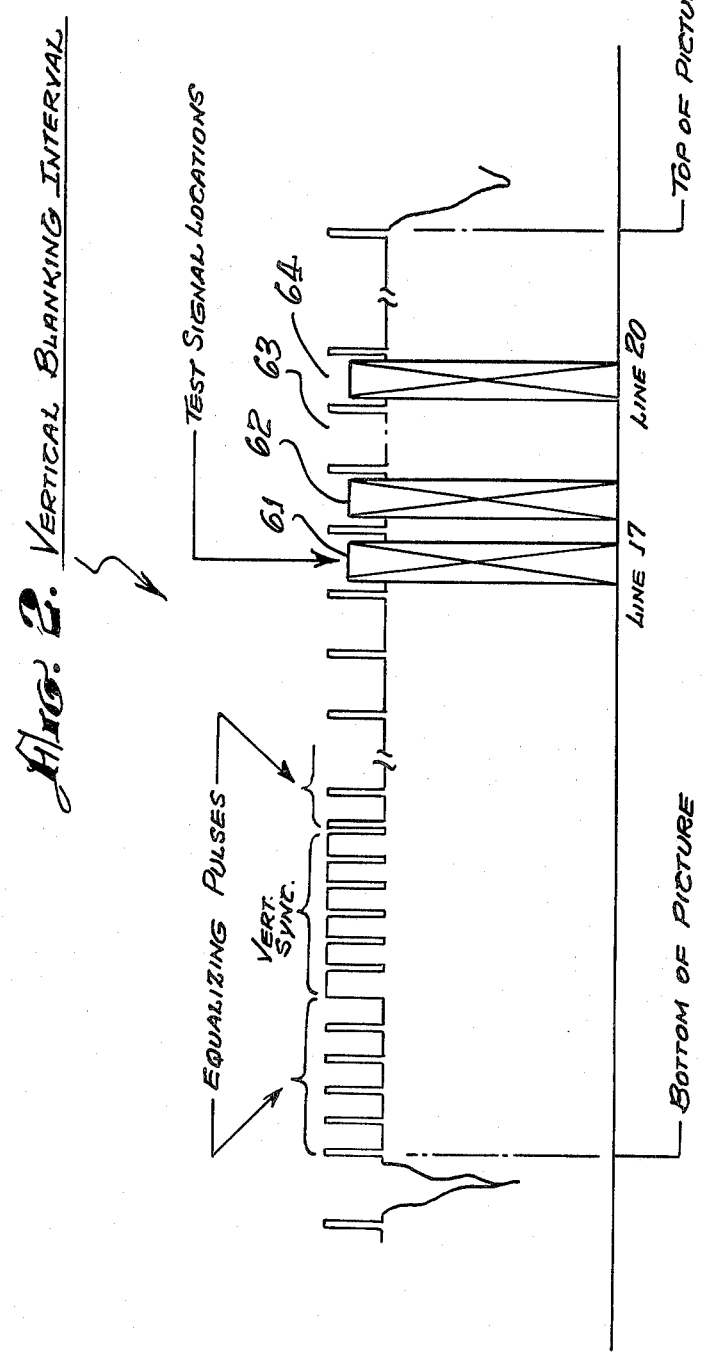

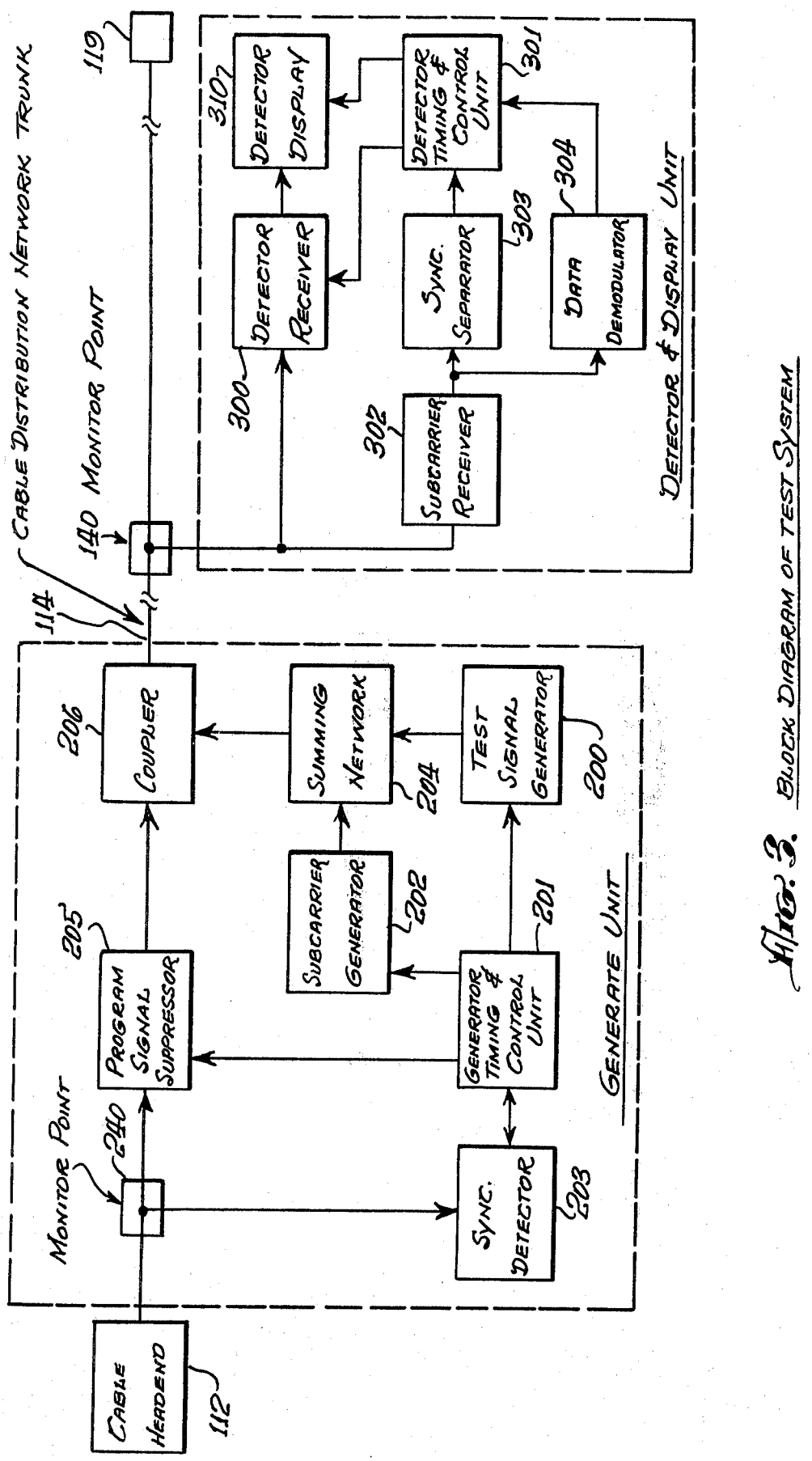
FIG. 3. BLOCK DIAGRAM OF TEST SYSTEM

4,408,227

METHOD AND APPARATUS FOR TELEVISION DISTRIBUTION SYSTEM SWEEP TESTING

CROSS REFERENCE TO RELATED PATENT APPLICATIONS

There are no patent applications filed by me related to the within application.

BACKGROUND OF THE INVENTION

1. Field of the Invention

This invention is in the general field of television testing methods and apparatus, it is more particularly directed to a method and apparatus for sweep testing in connection with cable television and the like. The invention is more directly related to a method and apparatus for the utilization of time division multiplexing between the test signal and the program signal in such manner as to eliminate interference between the program signal and the test signal in order that each may be displayed without interference. The invention utilizes a combination of means to generate the test signal, synchronization of test signal timing and transmission cooperative with the program signal, means to supress program material in the time position where the test signals will be applied; a means to synchronize detector and display, means to generate control and timing signals and apply them to test signal equipment, and a means to couple the test signal onto the network.

2. Description of the Prior Art

In the cable television industry it is known that there must be constant testing of signal strength and quality due to the nature of the distribution network wherein there may be numerous impairments due to bad tuning, bad connections, equipment failure, vandalism, nature elements, and the like.

Because of these problems the networks are monitored on a continuing basis. The methods used before the present invention included the insertion of a frequency sweeping test signal at some point in the input of a major distribution trunk and observation of its detected wave form at various points along the distribution network. The detector means and display amount to a spectrum analyzer. At the present time the testing in this manner creates certain interference with program signals which is most undesirable, or the test display will be cluttered with the regular program display, reducing its effectiveness. Additionally, the test display will be less than fully effective since it cannot normally be interjected at full strength because of program and test signal mutual interference.

For the first time the present method and apparatus involves the utilization of time division multiplexing between the test signal and the program signal applied to the distribution network in such manner that the program signal is not affected by the test signal and vice versa.

SUMMARY OF THE INVENTION

The cable television industry and other distribution systems for television-type transmission is a very large and complex industry growing in use each day.

The purpose of a cable television system is, of course, to provide the very best quality reception of picture (and sound) to the television receiver. Unfortunately, there are many intereferences which occur and can substantially upset the quality of the picture being received. There are numerous causes which are known to those skilled in the art particularly such causes include external physical causes, equipment variations, accidents, connection failures, and the like.

In order to minimize the interference with program reception by users of cable television service and the like, it is customary and necessary to test the distribution system with test signals on a constantly recurring basis. This is accomplished by the use of a frequency sweeping test signal generally between 5 MHz and 450 MHz. The detector is in effect a spectrum analyzer and the display depicts frequency response of the distribution network and indicates any impairments which may be present.

The presently used methods and apparatus for this testing procedure are important and valuable, but there is a degree of impairment with the program as received. This to a certain extent is self-defeating for the testing purposes.

I have now conceived and perfected a new and unique system for interjecting the test signals in such manner that there is not interference with the program signals. Likewise, the aim of a perfect test signal is accomplished since the program signals do not interfere with the test signals.

As is known to those skilled in the art, there are a number of vertical lines through which program material is transmitted to television and there are intervals in which the vertical lines are blank for a time factor and breadth which does not interfere with the program material.

Test signals may be placed into the vertical blanking interval of the television signal. The vertical blanking is off-screen and therefore a test signal interjected here and properly time multiplexed in coordination with the regular television signal is never seen. Testing into the off-screen vertical blanking interval is involved in the present invention and by the method employed solves all of the problems heretofore existing in testing of a cable television network.

The approach is for a time division multiplexing between the test signal and the program signal being applied to the distribution network. Thus, the two signals will be isolated from each other and thus the viewer will not perceive the test signal nor any interference caused thereby. Further, the test signal detector will only see the actual test signal, resulting in extreme accuracy.

Also in view of the complete isolation from interference with the program signal, the power level of the test signal can be the same as that of the program signal, thus providing for accuracy and resolution not heretofore possible.

It is an object of this invention to provide a method and apparatus for interjecting test signals into cable television transmission and distribution systems or the like for determining the condition of the equipment and transmission and to detect impairments.

Another object of this invention is to provide such a method as above mentioned wherein the regular program signal and the test signal are isolated from each other so that neither interferes with the other.

Another object of this invention is to provide such a method and apparatus as described wherein the power level of the test signal can be the same as the power level of the program signal.

The foregoing and other objects and advantages of this invention will become apparent to those skilled in the art upon reading the description of a preferred embodiment which follows in conjunction with a review of the appended drawings.

BRIEF DESCRIPTION OF THE DRAWINGS

FIG. 2 is a block diagram indicating the elements utilized in the method of this invention;

FIG. 3 is a schematic representation of the vertical blanking interval utilized in the method of this invention.

DESCRIPTION OF A PREFERRED EMBODIMENT

Figure 1:
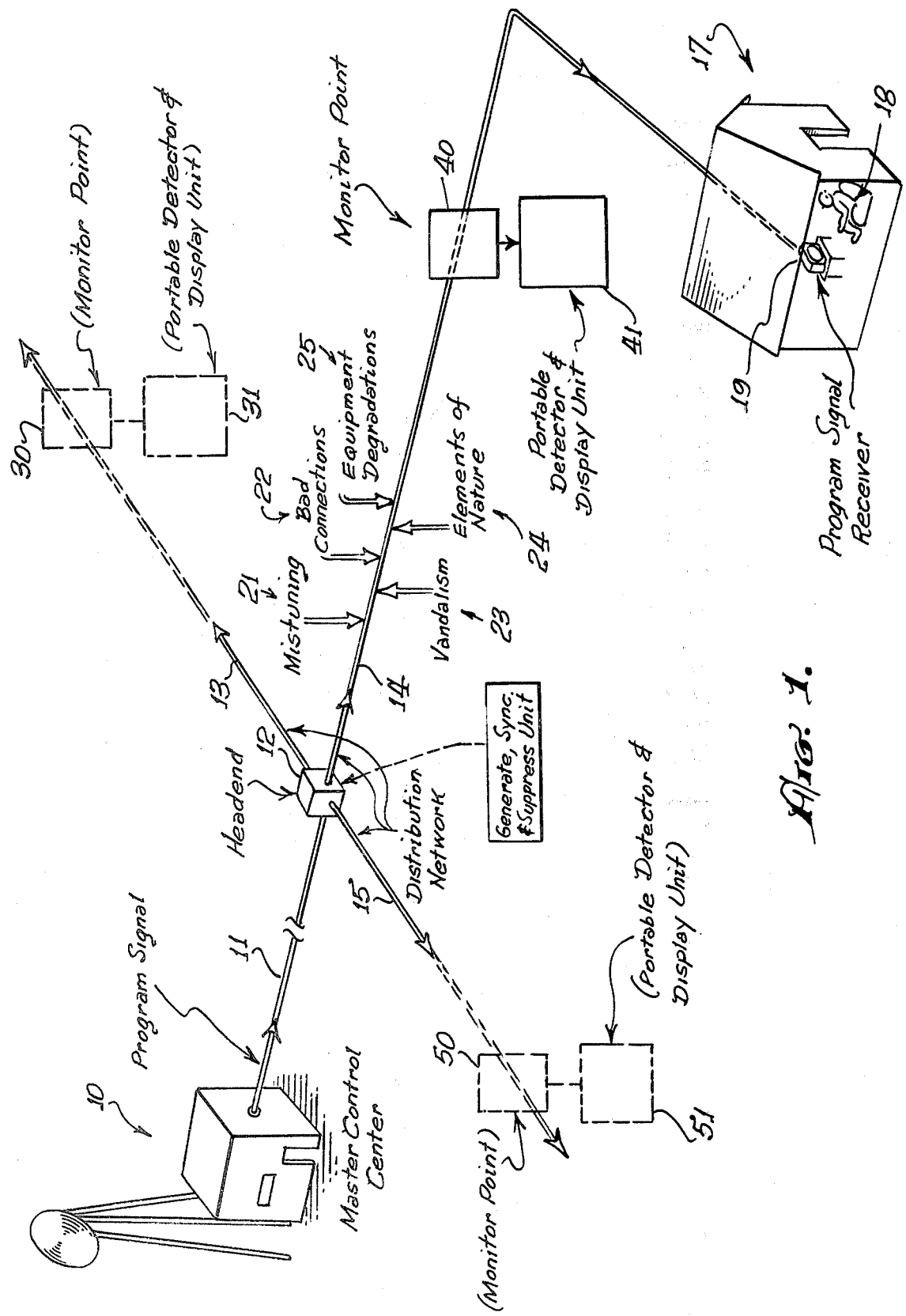
FIG. 1 is a schematic diagram of a typical cable television distribution network.

FIG. 1 is a schematic representation of a cable television transmission and distribution network.

From a master control center 10, a signal will be transmitted by customary means through signal carrier 11 to the head end 12 of the distribution network. From the head end there will be a plurality of distribution nuts such as 13, 14 and 15.

Each of the distribution nuts will be subject to potential sources of signal distortion or interruption such as mistuning 21, bad connections 22, vanadalism 23, elements of nature 24, equipment degradations 25, and the like. There are so many potentials of signal interference or distortion that they cannot be adequately listed but they are known to those skilled in the art.

From whatever source the problem may arise, however, interference with proper signal is intolerable and thus the monitoring must take place.

A portable detector and test signal display unit 31, 41, 51, and the like, may be connected to various monitor points 30, 40, and 50 as indicated.

The proper monitoring through the display and detector unit 41 of the test signals will show the quality of the picture 19 being displayed to viewer 18 at location 17.

Without this constant monitoring the picture can deteriorate badly. Without the use of the special method employed in this invention, each utilization of a test signal by the monitor 41 may interfere with the picture 19.

The test signal is generated, and the entire synchronization and suppression unit as hereinafter described is contained and located at the head end, preferably.

The utilization of the special synchronization and the like as hereinafter further described prevents interference with the picture 19 by reason of the generation of the test signals and their receipt by the detector and display units. Likewise, by the utilization of this system at 12, a high level test signal the equivalent of the program signal may be utilized and observed.

The use of the vertical blanking interval will be understood by those skilled in the art by examination of FIG. 2 which illustrates the well-known vertical blanking. The test signal locations are normally between lines 17 and 20 since the Federal Communications Commission has authorized test signal injection for this area. It is to be understood then that the test signals as heretofore described and hereinafter described will fall within these particular vertical blanking interval lines normally. FIG. 2 is merely a schematic diagram to show this location utilizing lines 17 (61), 18 (62), 19 (63), and 20 (64).

FIG. 3 is a block diagram which shows all of the elements utilized in this new and unique method for constant testing ability in a television cable network.

Cable head end 112 is shown transmitting to an ultimate viewing area 119. Monitor points 240 and 140 are indicated. In connection with the test signal generator, there are the generator timing and control unit 201, the subcarrier generator 202, the synchronization detector 203, and the summing network 204. In addition, there must be the program signal suppression means 205.

A coupler 206 is of course required to couple the test signal with the program carrier.

The synchronization detector coupled in the manner shown with monitor point 240 is caused to act with the other elements in synchronizing the suppression of the program in the vertical blanking off-screen situation with the test signal.

Ultimately, at monitor point 140 or the like, the detector receiver 300 in connection with the subcarrier receiver 302 will receive the signals from the cable 114. The subcarrier will provide the information for the synchronization separator and data demodulators 303 and 304, respectively, and thus control the detector timing and control unit 301. This results in the detector display 310 receiving correctly and without interference the test signal alone. At the same time, because of the manner in which the test signal is generated and transmitted as heretofore described, the test signal and its monitoring and display has not interfered with the program as received at 119.

In summary, in operation, there must be the generator unit as indicated in the block diagram, which may be located at any place in the distribution network, but normally would be at the head end.

In the generator unit, the program signal is applied to both the program signal suppressor and the synchronization detector. The synchronization detector provides both vertical and horizontal synchronization signals to the generator timing and control unit and it is tuned by increments across the various channels in the band of frequencies to be swept and tested by means of signals from the generator timing and control unit.

The generator timing and control unit is placed in control of the tuning of the synchronization detector and the sweep and frequency perimeters concerned.

The perimeters concerned will be clear to those skilled in the art and will include sweep rates, frequency end points and gaps, areas which are not to be swept and tested, and other factors which can be mixed and will be understood to those skilled in the art.

Appropriate transmission gating of the test signal and the associated suppression of the program signal are processed through the generator timing and control unit.

The generator timing and control unit also creates a modulation signal for the subcarrier generator indicated in the block diagram FIG. 3. The modulation signal is important in that it contains time synchronization signals, as well as previously encoded information concerning the desired frequency perimeters. Subcarrier frequency, of course, is selected so as to be out of the range of interference with the program material.

A summing network has been described in the block diagram FIG. 3. It is understood that this is the combination of the test signal generator and the subcarrier generator and is applied to the distribution network through appropriate coupling, as will be known to those skilled in the art and as is shown on the block diagram FIG. 3.

When the detector and display unit (a portable unit which can be connected at any desired monitor point) receives the incoming signal, it is received through both a detector receiver and a subcarrier receiver. The subcarrier receiver will be constructed so as to respond only to the subcarrier and its modulation. Thus the synchronization signals and the sweep perimeters will be separated from the demodulated output of the subcarrier receiver in the synchronization separator and data demodulation units. These two signals will then be processed in the detector timing and control unit into signals for the detector receiver and display units.

The detector receiver will be so tuned as to be in step with the test signal generator by way of the signals (which are command and timing signals) from the detector timing and control unit. The resulting signal will be a video signal with an amplitude proportional to the power level of the signal at the monitor point being tested.

The detector display unit time demultiplexes the test signal by means of the timing signals from the detector timing signal and control unit, this providing a test signal which can be further processed as desired for suitable display or for storage, or both.

While in this description there have been specific locations for the generating unit, the detector and display unit, and the like, it is to be understood that such are for purposes of description only. Other locations can easily be used in this system.

While the embodiment of this invention shown and described is fully capable of achieving the objects and advantages desired, it is to be understood that this embodiment has been shown for purposes of illustration only and not for purposes of limitation.

I claim:

1. Apparatus for testing television distribution networks comprising in combination: a synchronization detector connected to a television distribution network; a test signal generator; means connecting the test signal generator and the synchronization detector to a generator timing and control unit means; means controlled by the generator timing and control unit for periodically suppressing program material; subcarrier generator means controlled by the generator timing and control unit; means for combining the test signal and the subcarrier; means coupling the combined subcarrier and the test signal to the television network; means along the television distribution network at a distance from the test signal generating means suitable to be connected to a test signal detector receiver; a test signal detector receiver connectable to said means to connect; a subcarrier receiver operable with said detector to receiver subcarried signals; data demodulator and synchronization seperator connected to said subcarrier receiver; detector timing and control means connected to said synchronization seperator and data demodulator; and a means connecting said detector receiver and detector timing and control means to a detector display.

* * * * *